United States Patent
Carlsson et al.

(10) Patent No.: US 8,862,084 B2
(45) Date of Patent: Oct. 14, 2014

(54) METHODS AND APPARATUS FOR RECEIVER QUALITY TEST MEASUREMENTS

(71) Applicants: Torsten Carlsson, Lund (SE); Kjell Torgil Svensson, Linkoping (SE)

(72) Inventors: Torsten Carlsson, Lund (SE); Kjell Torgil Svensson, Linkoping (SE)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/870,405

(22) Filed: Apr. 25, 2013

(65) Prior Publication Data

US 2013/0303098 A1 Nov. 14, 2013

Related U.S. Application Data (60) Provisional application No. 61/640,266, filed on Apr. 30, 2012, provisional application No. 61/644,085, filed on May 8, 2012.

(51) Int. Cl.
*H04B 17/00* (2006.01)
*H04B 1/16* (2006.01)

(52) U.S. Cl.
CPC .......... *H04B 17/0042* (2013.01); *H04B 17/008* (2013.01); *H04B 17/006* (2013.01); *H04B 17/0085* (2013.01)
USPC ...................................... 455/226.1

(58) Field of Classification Search
USPC .......................................... 455/226.1–226.4
See application file for complete search history.

(56) References Cited

U.S. PATENT DOCUMENTS

| 5,737,693 | A | 4/1998 | Aldridge et al. |
| 7,203,472 | B2 | 4/2007 | Seppinen et al. |
| 2005/0260962 | A1 | 11/2005 | Nazrul et al. |
| 2006/0030277 | A1* | 2/2006 | Cyr et al. .................. 455/77 |
| 2013/0021048 | A1* | 1/2013 | Peng et al. ............... 324/750.3 |

FOREIGN PATENT DOCUMENTS

| EP | 0905940 A2 | 3/1999 |
| GB | 2439769 A | 1/2008 |

OTHER PUBLICATIONS

EPO, Int'l Search Report in PCT/EP2013/058935, Aug. 16, 2013.
EPO, Written Opinion in PCT/EP2013/058935, Aug. 16, 2013.
S.-C. Shin et al., Test Method by Each Part for Wireless Transmitter and Receiver System, Proc. 11th Int'l Conf. Advanced Comm. Tech., Feb. 15, 2009, pp. 2261-2267, IEEE.
A. Halder et al., Low-Cost Alternate EVM Test for Wireless Receiver Systems, Proc. 23rd VLSI Test Symposium, May 1, 2005, pp. 255-260, IEEE.

* cited by examiner

*Primary Examiner* — Lee Nguyen
(74) *Attorney, Agent, or Firm* — Piedmont Intellectual Property (57) ABSTRACT

Radio receiver test methods and apparatus are based on known relationships between the quality of a receiver that is measured based on signals before they enter a receiver decoder and the quality that is measured based on signals after the decoder. Thus, a signal generator can be set to transmit a known signal in a predetermined radio scenario (e.g., channel frequency, amplitude, etc.), and samples can be obtained of the receiver-processed known signal before the receiver's decoder. Tests in radio scenarios where noise is the dominant signal disturbance and/or tests in radio scenarios where receiver distortion is the dominant signal disturbance can be performed.

21 Claims, 4 Drawing Sheets

METHODS AND APPARATUS FOR RECEIVER QUALITY TEST MEASUREMENTS

This application claims the benefit of the filing dates of U.S. Provisional Patent Applications No. 61/640,266 filed on 30 Apr. 2012 and No. 61/644,085 filed on 8 May 2012, both of which are incorporated here by reference.

TECHNICAL FIELD

This application relates to radio receivers and more particularly to methods and apparatus for testing the quality of such receivers.

BACKGROUND

All cellular handsets have to be calibrated and tested during production in order to tune them and verify that they behave according to defined requirements. With the technology used presently in production, these activities take a substantial time to process, and high costs are related to this production time. Furthermore, the trend is to add more Radio Access Technologies (RATs) and frequency bands into the same produced unit, and this will drive test and calibration time to even higher numbers.

One large contributor to test time is verification of the receiver quality. Present technology normally uses either standard connected calls or simplified connected calls, where the tested unit, or device under test (DUT), is set to receive and decode information on a specific communication channel under a specific static radio environment. The quality of the decoded information, normally quantified as bit error rate (BER) or throughput, is used as a quality value of the receiver. Another quality verification method used by some manufacturers is to use a simple non-modulated signal as an input signal and a signal-to-noise-ratio (SNR) estimate of the received (output) signal as a quality value.

U.S. Pat. No. 7,203,472 to Seppinen et al., for example, states that it discloses, among other things, a method of operating a radio frequency (RF) that includes generating a calibration signal; injecting the calibration signal after any antenna into a low noise amplifier (LNA) of the RF receiver; and measuring a frequency down-converted response of the receiver at a plurality of different frequencies of the calibration signal.

U.S. Pat. No. 5,737,693 to Aldridge et al. is an example of a baseband simulation system for testing an RF subsystem of a communication device under test. In a transmit mode, pre-stored discrete in-phase (I) and quadrature (Q) samples are retrieved from which transmit analog I and Q signals are reconstructed and provided to the RF subsystem under test to determine the ability of the RF subsystem under test to modulate the analog I and Q signals onto one or more RF carrier signals. In a receive mode, analog I and Q signals received from the RF subsystem are converted to I and Q samples that are analyzed to determine the ability of the RF subsystem under test to demodulate the RF carrier signals to output the analog I and Q signals.

U.S. Patent Application Publication No. US 2005/0260962 by Nazrul et al. describes a test system that emulates the analog processing portion of a communication device and adjusts input signals based on distortions specified by a user and control signals generated by a baseband processing portion of the communication device. It appears that the test system does not measure receiver quality.

GB2439769 by Dubois et al. describes a device for testing a baseband part of a first transceiver (e.g., a mobile phone) that simulates the baseband of a second transceiver (e.g., a base station), and a device for testing a front-end part of the first transceiver that simulates the baseband of the first transceiver and baseband and front-end of the second transceiver.

Current quality verification technology using the receiver decoder prior to quality detection has several problems. For example, receivers need to decode information correctly and so the acceptable error thresholds on decoded information are very low. To get a statistically relevant quality measure, a lot of information has to be received. This typically leads to long quality-measurement times, typically about one second for a single measurement.

For another example, modern decoding techniques are very good at correcting errors. This leads to a very sharp transition between detecting a DUT as good and detecting the DUT as bad. The actual position of the transition is very difficult to estimate from a single measurement under a specific radio condition. The conventional test shows only that a DUT either passes or fails under the test condition; it does not estimate at all under what conditions the DUT will fail.

In addition, since decoders are very good at correcting errors and radio test conditions in factories are very simple static tests with no multipath conditions, there is a non-negligible probability that actual errors in a DUT will not be detected by a test. Moreover, using a DUT's decoder forces the DUT to involve fairly complex signaling or semi-signaling scenarios with extra cost in test time as well as added requirements on the test signal generator and other equipment.

Furthermore, current receiver quality verification techniques focus mainly on verifying performance in situations where noise is the dominant disturbance. These tests are typically relevant to verifying that a DUT is able to receive weak signals close to radio-cell boundaries. That is, however, not such a dominant scenario any more. With the introduction of wireless broadband communication, it has become important for a DUT to have low enough distortion to enable high speed communication. Distortion can be tested using quality measurements after a DUT's decoder, but that is normally not done due to the extra time required in production. Quality verification methods that estimate the SNR of a non-modulated carrier also cannot be used for distortion verification because the test signal needs to be modulated with a statistically relevant signal to enable distortion quality measurement.

SUMMARY

In accordance with aspects of this invention, tests are focussed on verifying parts in a receiver that are sensitive to production flow variation or component variation. Static receiver parts, such as decoding algorithms implemented in hardware or software, need not be tested as such parts are evaluated during the design phase of a class or type of receivers, and so tests of such parts do not have to be repeated for each produced unit of the class.

In accordance with aspects of this invention, there is provided a method of measuring a quality of a receiver having an input, a decoder, and an output. The method includes providing a test signal to the input, the test signal being representative of communication signals handled by the receiver; sampling, before the decoder, a signal generated by frequency-dependent components of the receiver from the test signal, thereby forming a sampled signal; and generating an estimate of the quality of the receiver based on a quality of the sampled signal, where the quality of the sampled signal is representative of a quality of a received signal at the output of the receiver.

Also in accordance with aspects of this invention, there is provided an apparatus for measuring a quality of a receiver having an input, a decoder, and an output. The apparatus includes a first device configured for providing a test signal to the input, the test signal being representative of communication signals handled by the receiver; a second device configured for sampling, before the decoder, a signal generated by frequency-dependent components of the receiver from the test signal, thereby forming a sampled signal; and a third device configured for generating an estimate of the quality of the receiver based on a quality of the sampled signal, where the quality of the sampled signal is representative of a quality of a received signal at the output of the receiver.

BRIEF DESCRIPTION OF THE DRAWINGS

The several features, objects, and advantages of this invention will be understood by reading this description in conjunction with the drawings, in which.

DETAILED DESCRIPTION

This description is directed to quality testing of handsets and other devices for cellular radio telephone systems, but it will be understood that this invention is not limited to testing of such devices.

Test methods and apparatus in accordance with this invention are based on known relationships between the quality of a receiver that is measured based on signals before they enter a receiver decoder and the quality that is measured based on signals after the decoder. Thus, a signal generator can be set to transmit a known signal in a predetermined radio scenario (e.g., channel frequency, amplitude, etc.), and samples can be obtained of the receiver-processed known signal before the receiver's decoder.

In accordance with aspects of this invention, methods and apparatus for evaluating the quality of a receiver in a time-efficient way are provided that include comparing a receiver-processed signal to a known signal produced by a signal generator. Methods and apparatus are also described that include recalculating received signals in an efficient way to enable fast tests of receiver quality. These methods and apparatus can be used for tests in radio scenarios where noise is the dominant signal disturbance and/or for tests in radio scenarios where receiver distortion is the dominant signal disturbance.

In accordance with aspects of this invention, an example of a method of measuring a quality of a receiver includes providing a test signal to an input of the receiver. The receiver thereby forms a received signal at an output of the receiver in the normal course of the receiver's processing of the test signal. Samples of the processed test signal in the receiver are collected, and those samples, which can be called a sampled signal, are collected before the receiver's decoder, which as noted above is a static part of the receiver, at least from the point of view of receiver quality measurement.

As explained in more detail below, the "static" parts of a receiver or DUT are generally those that do not include the frequency-dependent components of the receiver. The "frequency-dependent components" generally include radio-frequency dependent components such as the duplex filters that are typically included in DUTs and that have different behaviors based on the frequency of the radio channel of interest, and other frequency-dependent components such as channel filters that are designed to have the same behavior for all radio channels but have frequency-selective behavior across the channel bandwidth. In general, the frequency-dependent components are analog components rather than digital components. In other words, the static parts are those that do not affect in any substantial way the known relationship between the signal quality measured at the input of the decoder and the signal quality measured after the decoder. An electronic processor, such as a suitably programmed signal processor, generates an estimate of the quality of the receiver based on a quality determined from the collected samples. Such a signal processor can be part of the DUT or external to it.

Of course, the quality determined from the samples and the quality of the receiver are functionally related, and that functional relationship can be readily determined from theoretical analyses or computer simulations. The receiver quality can be indicated by a quantity such as BER and/or throughput, and it will be understood that other quantities indicative of receiver quality can be used.

In addition, the test signal can be produced by a suitable test signal generator connected to an antenna port of the receiver, and the test signal can also be a repetitive, modulated signal that has a repetition length and a modulation selected for generating estimates of the quality of the receiver. Suitable statistical characteristics of the test, or reference, signal enable correct quality estimation compared to measurements of receiver signals after the decoder using current techniques. It will be understood that, in general, the test signal preferably has statistical characteristics that are the same as or similar to the statistical properties of a typical communication signal in a typical communication network in which a DUT would be used.

Figure 1A:
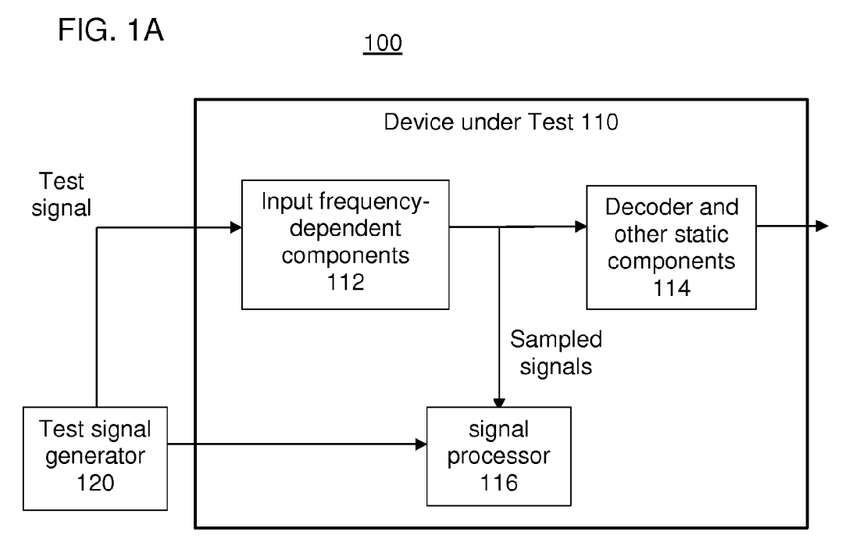
FIGS. 1A and 1B are schematic diagrams of a receiver quality measurement system.

FIG. 1A is a schematic diagram that illustrates an apparatus 100 for measuring the quality of a DUT 110, such as a radio receiver, and in particular the components 112 of the DUT whose performance depends on frequency or other factors. Thus, the components 112 differ from the decoder and other static components 114 of the DUT 110. Predetermined test signals are produced by a suitable test signal generator 120 and provided as a modulated RF signal to an antenna port or other input of the DUT 110. The modulation impressed on the RF signal is provided as a reference signal to a signal processor 116, which can be included in the DUT 110 as shown in FIG. 1A. It will be understood that the predetermined test signals, or more precisely the reference signals, are thus known to the signal processor 116, which also receives samples of the test signals after processing (typically down-conversion and channel filtering) by the non-static components 112, and performs one or more quality measurements on the DUT 110 based on the reference signals and sampled signal. As described below, the processor 116 carries out computations and operations involved in measuring the quality of the DUT 110, and it will also be understood that the processor 116 can be implemented by a suitable controller that is configured to cause the DUT 110 to carry out its typical operations and that can be included or generated in the DUT 110.

Figure 1B:
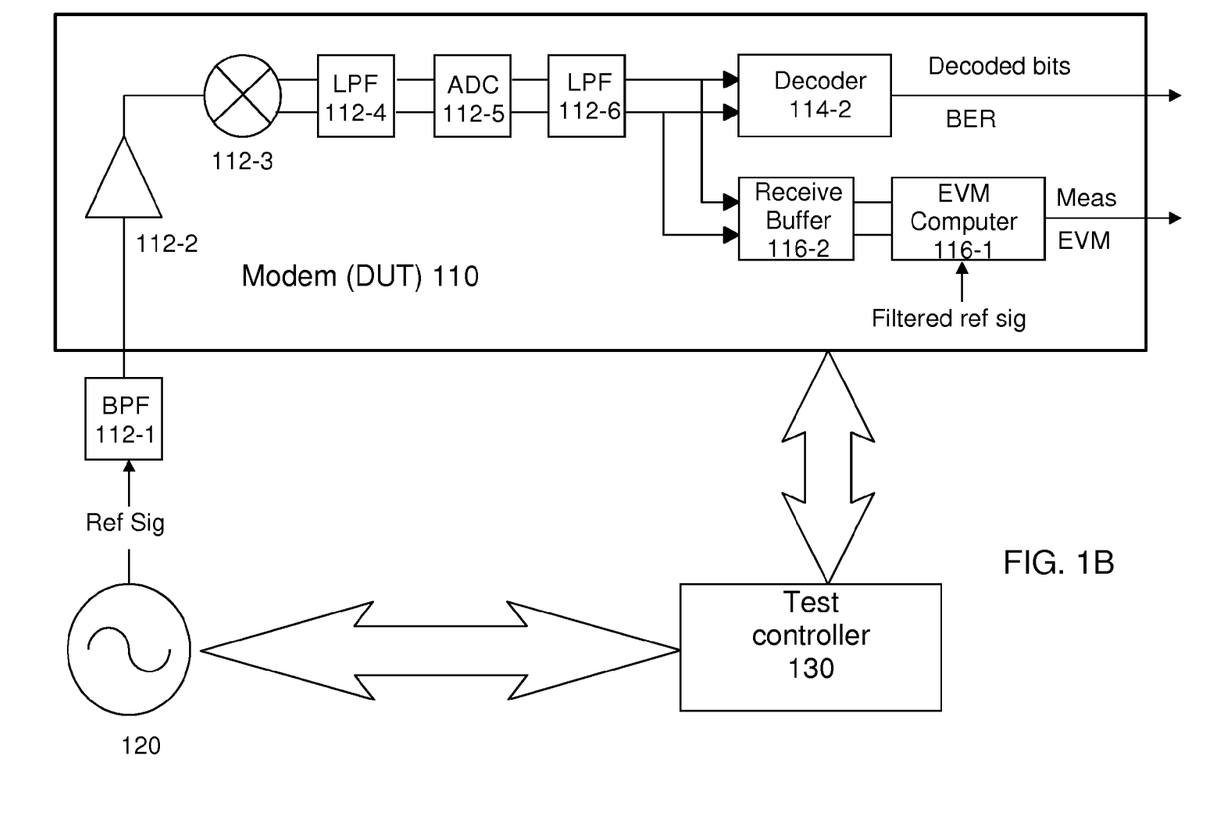

FIG. 1B is a schematic diagram that illustrates the apparatus 100 for receiver quality measurement in more detail. As illustrated in FIG. 1B, the non-static components 112 of the modem or DUT 110 can include a bandpass filter 112-1 that typically would receive an input RF signal from the DUT 110's antenna, an RF amplifier 112-2, a mixer 112-3 for down-converting or otherwise frequency-shifting the RF signal and generating I and Q signals, a low-pass filter (LPF) 112-4 for shaping the down-converted signals, an analog-to-digital converter (ADC) 112-5 for generating digital samples of the down-converted signals, and a LPF 112-6.

It will be noted that the non-static components 112 are generally but not necessarily only the components that handle analog signals in the DUT 110, e.g., LPF 112-6 is located after the ADC 112-5. It will also be noted that the reference signal used by the signal processor 116 is the equivalent of the test signal produced by the signal generator 120 with the ideal DUT filter chain applied to it, which can include both analog and digital parts. Thus, it should be understood that the static parts simply do not contribute to the EVM value (since it is included in the reference). It should also be understood that analog parts can have "static" components as well, e.g., a typical filter response can be treated as such.

Also as indicated in FIG. 1B, the digital samples produced by the ADC 112-5 are provided to the receiver's decoder 114-2, which produces decoded bits that can be used to compute a BER, throughput, or other performance measure in a suitable way. The decoder 114-2 and any subsequent components in the DUT's signal processing chain are considered the DUT 110's static components as they handle digital signals in the DUT 110. It can thus be appreciated that "static" components are digital components, at least in general, as those components are located after the ADC 112-5 and are those components that do not usually contribute to performance variations between DUTs. Taken together, the non-static components 112 and static components 114 can be considered as the normal signal path through the DUT 110. It will be appreciated that a DUT 110 can include other components besides those shown in FIG. 1B, and any such other components can be considered as either non-static or static components according to the difference described above.

It will be noted that the LPF 112-6 may be considered to be a part of the DUT's channel filtering, and so it is depicted in FIGS. 1A, 1B as if it is a non-static component. Nevertheless, the LPF 112-6 may have no significant effect on the quality measures generated as described below, and as the LPF 112-6 is located after the ADC 112-5, which is to say inside the digital domain of the DUT, the LPF 112-6 can also be considered a "static" component of the DUT.

FIG. 1B also shows a test controller 130, which is typically a suitably programmed computer or other electronic processor configured for controlling the signal generator 120 such that the signal generator outputs relevant reference signals. The test controller 130 can be implemented by a suitably programmed electronic processor, which can but need not be embedded in the DUT 110. As depicted in FIG. 1B, the DUT 110 can be controlled by the test controller 130 to receive a reference signal and compute a receiver quality measure, such as an error vector modulation or magnitude (EVM), based on the received reference signal.

As shown in FIG. 1B, computations required for computing the receiver quality measure can advantageously be performed by a suitably programmed signal processor 116-1 supported by a buffer memory 116-2 in the DUT 110. As seen in FIG. 1B, the samples stored in the buffer memory 116-2 are advantageously drawn from a point close to the edge of the DUT's digital domain, e.g., from the output of the ADC 112-5 or near to it, with the digital domain being understood as the static components 114, which as described above can include the LPF 112-6. The signal processor 116-1 can also be configured to carry out the operations of the test controller 130.

As depicted in FIG. 1B, the computer 116-1 can generate the receiver quality measure based on comparing the sampled signals drawn before the decoder 114-2 and stored in the receive buffer memory 116-2 with the reference signal, which can be a pre-stored filtered version of the test signal that has been processed by an ideal, or nominal, receiver without noise or distortion in the same manner as the DUT from antenna to sampling point. The filtered reference signal may be stored in the processor 116-1 or a suitable additional memory and can thus be considered an ideal sampled signal, i.e., a sampled signal without any errors. The receiver quality can then be estimated based on any difference between the sampled signal and the reference signal.

It will be appreciated that a reference signal produced by a nominal receiver is preferably not dependent on any frequency-dependent receiver parts located before down-conversion of an input signal from a channel carrier frequency to baseband or a fixed intermediate frequency. In a typical cellular handset, such a receiver part is the duplex filter. Any such frequency dependency is considered something that is detected in the quality receiver, but of course that is not always strictly necessary.

Thus, as described above, estimating receiver quality includes comparing a sampled signal with a reference signal, which can be the repetitive modulation signal impressed on the RF signal produced by the signal generator and processed in the same manner from antenna to sampling point in a nominal reference receiver with no noise addition or distortion. It should be understood that the reference signal can advantageously be a repetitive signal with selected characteristics, but the reference signal can in general be any signal that produces a known output signal that can be used for determining EVM or measuring and computing DUT quality, e.g., a signal from a conventional radio tester. The quality of the measurements with such equipment then generally depends on the signals the equipment is able to produce.

Receiver parts that are dependent on frequency and located before down-conversion are taken into account in the quality estimation in such a way that channel-dependent linear distortion is attenuated in the quality estimation. Such linear distortion is considered as something that can be handled by the receiver decoder, and thus it need not be detected in the quality estimation. As an alternative, frequency-dependent linear distortion can be taken into account in the quality estimation.

As described above, receiver quality is measured as a function of a difference between the sampled signal and the reference signal, and an advantageous function is the EVM. In general, one form of the EVM is given by the following expression:

$$EVM^2 = \frac{\sum_{i=1}^{N} |x_i - s_i|^2}{\sum_{i=1}^{N} |s_i|^2}$$

in which EVM is the EVM value, i is an index identifying signal values that runs from one to N, $x_i$ is the i-th sampled signal value, e.g., in the buffer 116-2, and $s_i$ is the i-th reference signal value.

Based on the expression for EVM, generating a receiver quality estimate using EVM includes forming a corrected sampled signal, determining a time offset between the corrected sampled signal and the reference signal, and computing an EVM value as the estimate. Forming the corrected sampled signal can include estimating a frequency error in the sampled signal; estimating a direct-current (DC) offset in the sampled signal; estimating a scale difference between the sampled signal and the reference signal; and correcting the frequency error and the DC offset. Those actions need not always be carried out in the order given above. In addition, determining a time offset between the corrected sampled signal and the reference signal can include sliding a time-correlation of the corrected sampled signal against the reference signal, and locating a peak of the slid correlation as an indicator of the time offset.

It should be understood that estimating the above-described errors and offsets enables correction before or during quality measure computation. In the interest of saving production time, it is desirable to iterate the estimations as few times as possible. For example, it is believed that an adequate quality measure can be obtained even by applying only one correction, for frequency error.

Linear distortion from frequency-dependent parts of the receiver can be addressed in quality estimation using EVM by also estimating the linear distortion and attenuating the estimated linear distortion before computation of the EVM value. The linear distortion due to receiver components such as duplex filters can be estimated by comparing a frequency-domain representation of the reference signal with a frequency-domain representation of a corresponding portion of the sampled signal. A time offset between the reference signal and the sampled signal is acceptable, and the frequency-domain representations can be generated in any convenient way, e.g., by fast Fourier transform (FFT) computations. The frequency-domain representations can be compared by forming their ratio, e.g.:

FFT(sampled signal)/FFT(reference signal)

which can then be taken as the linear distortion. If desired, the frequency-domain representations can be smoothed, e.g., by suitable digital filtering or averaging that can be implemented by the processor 116-1. The estimated linear distortion can then be attenuated by including a correction factor in the determination of the time offset between the corrected sampled signal and the reference signal. For example, the time offset can be determined in a suitable way to include suppression of the linear distortion.

Estimating the frequency error using EVM can be done by recognizing that the test signal from the signal generator is repetitive with a limited, known length L. Thus, a receiver sample r(i) has the same information as a sample r(i+nL), where n is an integer. Thus, the frequency error using EVM can be estimated by maximum likelihood estimation based on the repetition length of the test signal and varying the value of n stepwise in order. A minimum sequence length L determines the maximum initial frequency error that can be allowed without risk of a $2\pi$ phase uncertainty in the detection.

Correcting the frequency error can be based on a non-trigonometric function, and the method can advantageous include testing for propagation of quantization errors that would reduce the accuracy of the frequency error detection. Testing for quantization errors during production can be useful, but it may be more advantageously done by analyzing the quality measurement process in the design phase.

The estimate of the DC offset can be formed in the EVM computations as the average of the sampled signal over the whole length of the test signal. As an alternative, if the reference signal is known to have a DC offset, then the DC offset of the corrected sampled signal reference signal can simply be set to that DC offset.

Estimating the frequency error and estimating the DC offset using EVM can be executed in combination in one traverse of the sampled signal.

Sliding the time-correlation in an EVM computation can include determining a peak value of the correlation between the corrected sampled signal and the reference signal by at least one of oversampling and interpolation of the reference signal or the corrected sampled signal. The peak of the correlation indicates the time offset between the two signals with an accuracy that is set by the sampling rate. It will be understood that the complete received signal does not need to be used in the correlation, and the particular noise/distortion test scenario determines the length of the correlation needed to determine the time offset estimate with high enough probability.

It is believed that compared with conventional ways of measuring and computing receiver quality, the methods and apparatus described in this application provide much better results with about or less than one percent of the information required by the conventional ways. Thus, instead of several seconds being needed to generate EVM measures, they can be generated in times on the order of ten milliseconds or less.

It will also be understood that to reach a particular measurement accuracy target, finding a correlation peak that is in between two samples may be needed. This can be done by oversampling or interpolating one or both of the reference signal and the sampled signal. The amount of oversampling or interpolating needed to estimate the position of a correlation peak with low enough uncertainty can be readily determined empirically.

Moreover, the oversampling or interpolating can include down-sampling the corrected sample signal and the reference signal before sliding the time-correlation. This reduces the calculation power needed for the coarse synchronization by down-sampling at the cost of reduced time accuracy. After sliding the time-correlation of the down-sampled corrected sampled signal and reference signal, the down-sampled corrected sampled signal and reference signal are up-sampled stepwise, and the time-correlation of the up-sampled signals are slid around a correlation peak at each step, thereby determining a time offset between the corrected samples signal and the reference signal. Increasing the effective sampling rate stepwise and having local correlations at each step around the correlation peak can yield a more accurate position of the time offset. The length of the correlation at each step depends on the expected noise/distortion scenario, and can be chosen to reduce the computational load.

It should be understood that time offset accuracy is related mainly to time synchronization (sync) accuracy, i.e., the oversampling rate that is used. Thus, the determination of the time offset described above can be viewed as enhancing the accuracy of the position of the time offset but not necessarily the accuracy of the time offset. Time offset accuracy can be enhanced by better time synchronization, which can be achieved with less computational effort by methods described in this application as it is more efficient to reduce the sampling rate, find coarse time sync, and then iteratively increase the sampling rate and adjust the time sync until the initial sampling rate has been reached. Following that, it can be advantageous to carry out what can be called sync (e.g., by finding peaks between samples) to enhance the time resolution.

Down-sampling can include low-pass filtering the corrected sample signal and the reference signal. The lowest sample frequency is determined by the noise/distortion test scenario. The frequency is reduced as far as possible without having a significant risk of causing an error in the detection of the peak position.

Sliding a time-correlation can be implemented in the frequency domain, e.g., by Fourier-transforming the corrected sampled signal and the reference signal, conjugating one of the Fourier-transformed signals, multiplying the Fourier-transformed signal and the conjugated Fourier-transformed signal, and inverse Fourier-transforming the product of the multiplication.

The peak value of a correlation can be determined based on data points between samples of the corrected sampled signal and the reference signal according to a function of correlation values based on the samples. This can be done because the data points can be calculated by using a truncated interpolation filter, such as a truncated raised cosine filter. Furthermore, the peak correlation value can be computed based on interpolated correlation values instead of by first interpolating the data to be used in the correlation. Using interpolated correlation values can significantly reduce the computation power needed for measuring the receiver quality.

Values of either the reference signal or the corrected sampled signal can be interpolated to match a desired time offset, such as a minimum offset. The interpolated values can be determined by applying a suitable interpolation filter to the signal, e.g., a raised cosine filter that is truncated such that computations are reduced and needed interpolation accuracy is maintained. As an alternative, the interpolated values can be determined by introducing a corresponding phase shift (e.g., by adding a frequency-dependent phase ramp, or phase rotation of a frequency sample proportional to the frequency of the sample) to a frequency-domain representation of the signal, which can be produced by Fourier transform as described above. As another alternative, the reference signal can be oversampled to an extent needed to give the offset accuracy needed.

Furthermore, the EVM value described above can be calculated based on only a value of a correlation between the samples of the test signal and a time-shifted reference signal and a value of a power of the test signal. The value of the power of the test signal can be determined in combination with estimating the frequency error and estimating the DC offset as described above, and the final correlation can be combined with frequency offset and DC offset compensation of the sampled signal. Thus, a method of receiver quality estimation can be realized with traversing the input signal completely only two times. This yields a large saving of required computation power.

Figure 2:
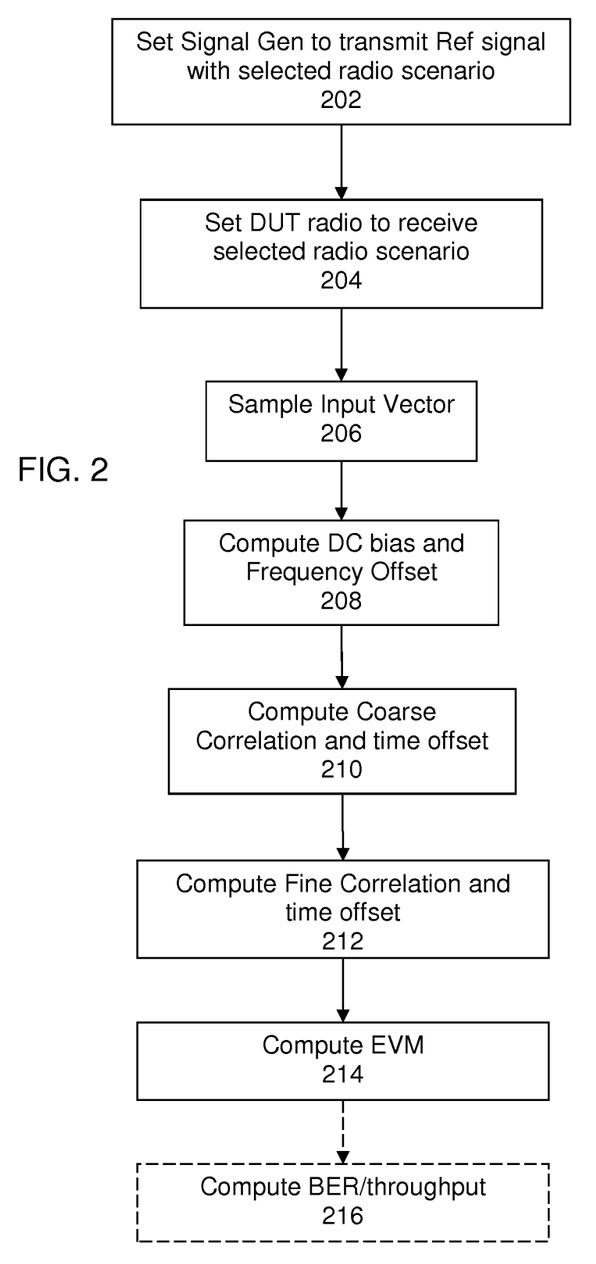
FIG. 2 is a flow chart that illustrates a method of determining a receiver quality measurement.

FIG. 2 is a flow chart of an example of a method of performing a single quality measurement, with a typical signal and calculation flow. In step 202, a RAT-specific reference signal is selected that has statistically relevant properties but also has a minimal or close to minimal length (duration). A suitably selected reference signal can also have properties that help with frequency error correction described above. The reference signal can be repeated until sufficient samples of an input vector are collected. In step 204, the radio in the DUT is set to the selected radio scenario, which can be done using the same driver as it uses to control the radio in normal signaling mode or another suitable driver. In either case, the radio should behave as it does in normal signaling mode. Moreover, non-static digital algorithms in the DUT can be disabled if only hardware-related factors are wanted in the receiver quality measurement.

In step 206, the signal is sampled before the digital detector, with the length of the sampling determined by the radio scenario. As described above in connection with FIG. 1B, the signal samples are stored in the receive buffer 116-2. The length of the sampling is preferably an integer-factor longer than the repetition length of the reference signal. In step 208, the DC and frequency offsets are determined, as those parameters need to be removed before comparison with the reference as described above.

In step 210, a "coarse" correlation of the sample input vector and reference signal is computed, for example by "sliding" one past the other, and the peak of that sliding correlation is taken as an indication of the time offset between the input signal and the reference with an accuracy of the sampling period. In step 212, a "fine" correlation is computed, as the accuracy of the time offset generally needs to be better than just the sampling period in order to meet device requirements. It will thus be understood that the "coarse" correlation is one that simply has a resolution limited by the sampling rate and that the "fine" correlation is one that has a higher resolution, e.g., through over-sampling or interpolating as described above.

In step 214, the EVM is computed, e.g., by determining a normalized power average of the difference between the input and reference signals. FIG. 2 also depicts an optional step 216, in which a quality measure such as BER or throughput is determined based on the EVM. As described above, the EVM can be used to compute BER or another quality measure as the quality of the sampled signal and the quality of the received signal are related by a function, which is to say that the quality of the sampled signal is representative of the quality of the received signal. For example, BER can be determined based on a mapping of BER to EVM produced from suitable receiver simulation with a bit-exact model of the receiver, including the demodulator and decoder. The mapping, i.e., the typically non-linear functional relationship, between BER and EVM can be determined from simulated input signal-to-noise ratio (SNR) vs. BER values for different relevant noise levels, verified through measurements on actual receivers. BER can also be determined based on the output of a DUT's decoder 114 as described above.

When using a method involving EVM as described above, estimating the frequency error in the sampled signal can be performed after determining the time offset when the time offset is known, and the method can further include estimating a phase ramp by generating a list of calculated phase shifts between the corrected sampled signal and the reference signal, determining phase shifts of $2\pi$, and determining a slope of the ramp. The phase shifts can be determined based on histograms of respective subsets of samples, and the slope of the estimated phase ramp can then be determined in a suitable way. The length of the list can be based on the expected radio conditions, and the magnitude of signal can be taken into account in estimating the phase ramp.

Also in accordance with aspects of this invention, an example of an apparatus for measuring a receiver quality includes a first device configured for providing a test signal to the input, thereby forming a received signal at the output; a second device configured for sampling, before the decoder in the receiver, a signal generated by the receiver from the test signal, thereby forming a sampled signal; and a third device configured for generating an estimate of the receiver quality based on a quality of the sampled signal. Such an apparatus can be configured, for example by suitable programming, to carry out any of the methods described above.

Methods and apparatus in accordance with aspects of this invention are expected to have a number of advantages over known techniques. For example, much less received data is needed to do a quality estimation, and with methods that minimize calculations, short test times can be obtained, e.g., 1-20 milliseconds per radio scenario, with receiver quality noise measurements spread by 0.1 db. That is significantly less than the 1 second that is typical for current measurement testing with decoded information. The test time depends somewhat on RAT and radio scenario, of course.

In addition, it is possible to measure receiver quality both for scenarios dominated by noise and scenarios dominated by receiver distortion, and no advanced test instruments with advanced signaling capabilities are needed. Tests can also be performed with an inexpensive signal generator that is able to transmit a user-defined signal.

Furthermore, the amount of software for carrying out the tests in a DUT is small, and so it can remain in the device after it leaves the factory. This enables fast and simple receiver quality measurements later at a service center, if necessary.

Since the execution times of the calculations and steps in the methods described above are predictable, the methods can be readily implemented in a so-called list mode configuration, in which the test instrumentation and a DUT independently step through a predefined activity list without needing to communicate with each other during execution of the list. This reduces any additional time needed for signaling between a DUT and the test instrumentation during a test.

It should also be understood that a method of measuring receiver quality, such as that depicted by FIG. 2, can be carried for each of a plurality of different test signals for different radio scenarios or conditions (e.g., RATs, channel frequencies, signal levels, etc.), and the different test signals can be generated by a controllable signal generator and provided to the receiver DUT in a controlled sequence, with the different test signals time-synchronized with the receiver. For example, testing a receiver can include one or more lists of radio conditions, with the signal generator and DUT controlled and time-synchronized in such a way that the list of an individual test runs automatically in sequence after the list starts. This is advantageous in that it reduces setup times between individual tests.

Figure 3:
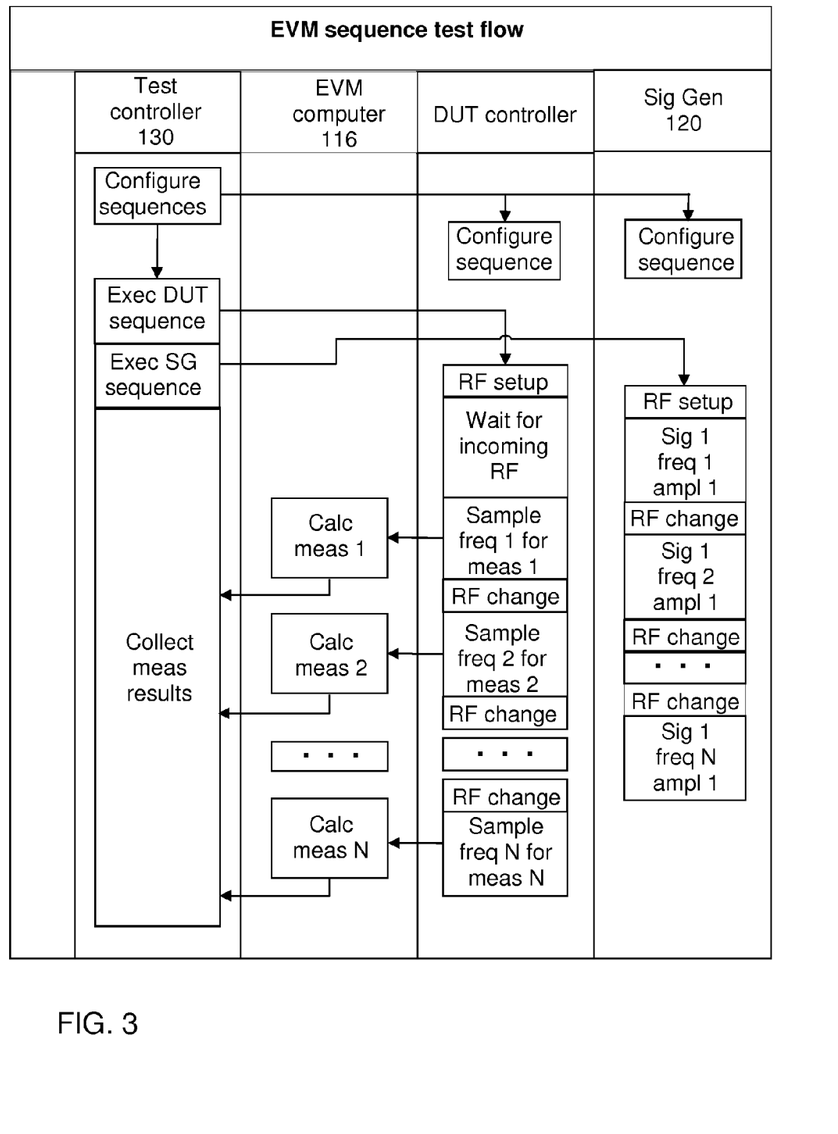
FIG. 3 is flow chart that illustrates a method of sequential receiver quality measurement.

FIG. 3 is a flow chart that illustrates an example of a method of performing a sequence of quality measurements. As depicted in FIG. 3, the test controller 130 is suitably configured to control the signal generator (SG) 120 and DUT 110 to carry out sequences of quality measurements. Once the SG 120 and DUT 110 are synchronized in time, the test sequence can run independently in the SG 120 and DUT 110 as a particularly time-efficient way to execute a high number of tests.

As depicted in FIG. 3, the test controller 130 can be configured to one or more measurement sequences and provide them to the SG 120 and the DUT controller. The test controller 130 can then direct the DUT controller to execute the configured measurement sequence and direct the SG 120 to execute the configured measurement sequence. After doing so, the test controller is configured to collect quality measurement results generated by the EVM computer 116 as described above.

Upon being directed to execute a measurement sequence, the DUT configures itself in a respective RF setup, or scenario, and then waits for an input reference signal from the SG 120. Upon input of the reference signal, the DUT collects signal samples and the EVM computer 116 computes a first value of the quality measure that is collected by the test controller. The DUT changes its radio frequency to a second frequency and collects signal samples for the EVM computer to compute a second value of the quality measure that is collected by the test controller. The DUT changes its radio frequency to a third second frequency and collects signal samples for the EVM computer to compute a third value of the quality measure that is collected by the test controller, and so forth, ending with a change to a frequency N and collection of a quality measure N. In general, the computations of the values of the quality measures can be decoupled from the collections of signal samples, which is to say that a DUT can start to receive new data as soon as the previous data has been received.

In a similar way, upon being directed to execute a measurement sequence, the SG 120 configures itself in a respective RF setup, or scenario, and generates an input reference signal, which may be called signal 1, that has a first frequency and amplitude. After completion of the appropriate number of repetitions of the first signal 1, the SG 120 changes signal 1 to a second radio frequency, and so forth, ending with a change to a frequency N.

The methods and devices described above can be combined and re-arranged in a variety of equivalent ways, and the methods can be performed by one or more suitable electronic circuits (e.g., discrete logic gates interconnected to perform a specialized function, or application-specific integrated circuits).

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the claims.

What is claimed is:

1. A method of measuring a quality of a receiver having an input, a decoder, and an output, the method comprising:
providing a test signal to the input, the test signal being representative of communication signals handled by the receiver;
sampling, before the decoder, a signal generated by frequency-dependent components of the receiver from the test signal, thereby forming a sampled signal; and
generating an estimate of the quality of the receiver based on a quality of the sampled signal, wherein the quality of the sampled signal is representative of a quality of a received signal at the output of the receiver; generating the estimate includes comparing the sampled signal with a reference signal that represents the test signal provided to the input after processing by nominal frequency-dependent components and sampled before the decoder, and the estimate of the quality of the receiver is based on a difference between the sampled signal and the reference signal; and the estimate of the quality of the receiver is based on a function of the difference between the sampled signal and the reference signal; the function includes an error vector modulation (EVM) function; and generating the estimate includes:

forming a corrected sampled signal by at least a plurality of:
- estimating a frequency error in the sampled signal;
- estimating a direct-current (DC) offset in the sampled signal;
- estimating a scale difference between the sampled signal and the reference signal; and
- correcting the frequency error and the DC offset; and determining a time offset between the corrected sampled signal and the reference signal, wherein determining the time offset includes sliding a time-correlation of the corrected sampled signal against the reference signal; and computing an EVM value as the estimate.

2. The method of claim 1, wherein the quality of the receiver includes a bit error rate or a throughput, and the test signal is a known signal and includes a modulation selected for generating the estimate of the quality of the receiver.

3. The method of claim 1, wherein the estimate of the quality of the receiver is generated such that linear distortion of the test signal by radio-frequency-dependent parts of the receiver is attenuated.

4. The method of claim 1, further comprising estimating the linear distortion corresponding to the frequency-dependent parts of the receiver; and attenuating the linear distortion before computing the EVM value.

5. The method of claim 4, wherein estimating the linear distortion includes comparing the reference signal in a frequency domain with a corresponding part of the sampled signal in the frequency domain and smoothing a result of the comparing, and attenuating the linear distortion includes determining a correction factor.

6. The method of claim 1, wherein the test signal is a repetitive signal, and estimating the frequency error is based on maximum likelihood estimation and a repetition length of the test signal.

7. The method of claim 1, wherein estimating the DC offset includes either averaging the sampled signal, or setting the DC offset to a DC offset of the reference signal.

8. The method of claim 1, wherein correcting the frequency error is based on a non-trigonometric function.

9. The method of claim 1, wherein estimating the frequency error and estimating the DC offset are executed in combination.

10. The method of claim 1, wherein sliding the time-correlation includes determining a peak value of the correlation between the corrected sampled signal and the reference signal by at least one of oversampling and interpolation of the reference signal or the corrected sampled signal.

11. The method of claim 10, wherein sliding the time-correlation includes Fourier-transforming the corrected sampled signal and the reference signal, conjugating one of the Fourier-transformed signals, multiplying the Fourier-transformed signal and the conjugated Fourier-transformed signal, and inverse Fourier-transforming a product of the multiplying.

12. The method of claim 10, further comprising down-sampling the corrected sample signal and the reference signal before sliding the time-correlation, wherein down-sampling includes low-pass filtering the corrected sample signal and the reference signal; and after sliding the time-correlation of the down-sampled corrected sampled signal and reference signal, up-sampling the down-sampled corrected sampled signal and reference signal stepwise and sliding the time-correlation of the up-sampled signals around a correlation peak for each step, thereby determining a time offset between the corrected samples signal and the reference signal.

13. The method of claim 10, wherein the peak value of the correlation is determined based on data points between samples of the corrected sampled signal and the reference signal according to a function of correlation values based on the samples.

14. The method of claim 1, further comprising interpolating values of either the reference signal or the corrected sampled signal to match a desired time offset.

15. The method of claim 14, wherein interpolating values of either the reference signal or the corrected sampled signal to match a desired time offset includes at least introducing a corresponding phase ramp in a frequency-domain representation of the respective signal.

16. The method of claim 1, wherein the EVM value is calculated based on a value of a correlation between the test signal and a time-shifted reference signal and a value of a power of the test signal.

17. The method of claim 16, wherein the value of the power of the test signal is determined in combination with estimating the frequency error and estimating the DC offset, and final correlation is combined with frequency offset and DC offset compensation of the sampled signal.

18. The method of claim 1, further comprising carrying out the method for each of a plurality of different test signals, and generating the different test signals in a controllable signal generator, the different test signals being provided to the receiver in a sequence and the different test signals time-synchronized with the receiver.

19. The method of claim 1, wherein estimating the frequency error in the sampled signal is performed after determining the time offset when the time offset is known, and comprises estimating a phase ramp by generating a list of calculated phase shifts between the corrected sampled signal and the reference signal and determining phase shifts of $2\pi$ based on histograms of respective subsets of samples, and determining a slope of the estimated phase ramp.

20. An apparatus for measuring a quality of a receiver having an input, a decoder, and an output, the apparatus comprising:
a first device configured for providing a test signal to the input, the test signal being representative of communication signals handled by the receiver;
a second device configured for sampling, before the decoder, a signal generated by frequency-dependent components of the receiver from the test signal, thereby forming a sampled signal; and
a third device configured for generating an estimate of the quality of the receiver based on a quality of the sampled signal, wherein the quality of the sampled signal is representative of a quality of a received signal at the output of the receiver;
wherein the third device is configured to generate the estimate by at least comparing the sampled signal with a reference signal that represents the test signal provided to the input after processing by the frequency-dependent components and sampled before the decoder, the estimate of the quality of the receiver is based on an error vector magnitude (EVM) function of the difference between the sampled signal and the reference signal, and generating the estimate includes:
forming a corrected sampled signal by at least a plurality of:
- estimating a frequency error in the sampled signal;
- estimating a direct-current (DC) offset in the sampled signal;

estimating a scale difference between the sampled signal and the reference signal; and correcting the frequency error and the DC offset; and determining a time offset between the corrected sampled signal and the reference signal, wherein determining the time offset includes sliding a time-correlation of the corrected sampled signal against the reference signal; and computing an EVM value as the estimate.

21. The apparatus of claim 20, wherein the estimate of the quality of the receiver is generated such that linear distortion of the test signal by radio-frequency-dependent parts of the receiver is attenuated.

* * * * *